June 24, 1924.

Re. 15,863

G. B. TREW

PIPE WRENCH

Original Filed Aug. 28, 1920

G. B. Trew, Inventor

By C. A. Snow & Co.

Attorney

Reissued June 24, 1924. Re. 15,863

UNITED STATES PATENT OFFICE.

GEORGE BARNETTE TREW, OF SHREVEPORT, LOUISIANA, ASSIGNOR, BY MESNE ASSIGNMENTS, OF ONE-HALF TO GUIBERSON CORPORATION, A CORPORATION OF DELAWARE.

PIPE WRENCH.

Original No. 1,388,079, dated August 16, 1921, Serial No. 406,546, filed August 28, 1920. Application for reissue filed June 22, 1922. Serial No. 570,260.

*To all whom it may concern:*

Be it known that I, GEORGE B. TREW, a citizen of the United States, residing at Shreveport, in the parish of Caddo and State of Louisiana, have invented a new and useful Pipe Wrench, of which the following is a specification.

This invention relates to new and useful improvements in pipe wrenches which are adapted to engage on a pipe or other piece of material which is preferably circular in cross section.

The object of the invention is to provide a self closing and automatically fastening wrench which may be engaged about the work by simply moving the head and grip into contact therewith, whereby the grip is closed about the work and latched and the work snugly received in the head.

A further object is to provide a pivoted gripping member arranged when open, to have a portion protruding so as to be engaged by the work, whereby the gripping member is swung about the work automatically.

Another feature resides in a means of fastening the gripping member in its closed position, arranged to operate automatically when engaged by said member.

A still further object of the invention is to provide improved means for operating and controlling the jaws which engage the work.

Another object of the invention is to provide novel means whereby the tubular material or other objects worked upon, cannot be crushed or seriously marred by the teeth of the jaws.

It is within the province of the disclosure to improve generally and to enhance the utility devices of that type to which the invention appertains.

A construction designed to carry out the invention will be hereinafter described together with other features of the invention.

Figure 1:
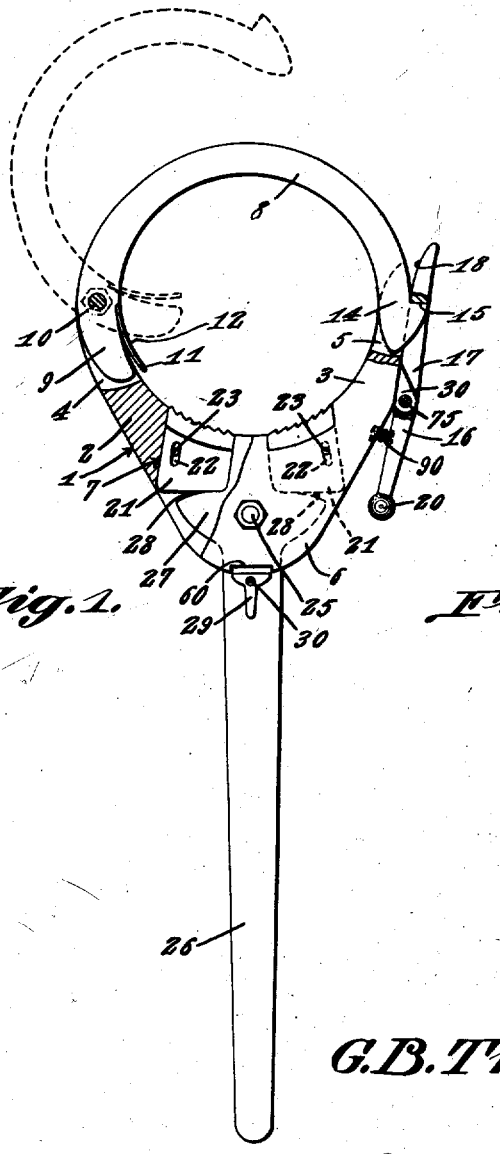
Figure 2:
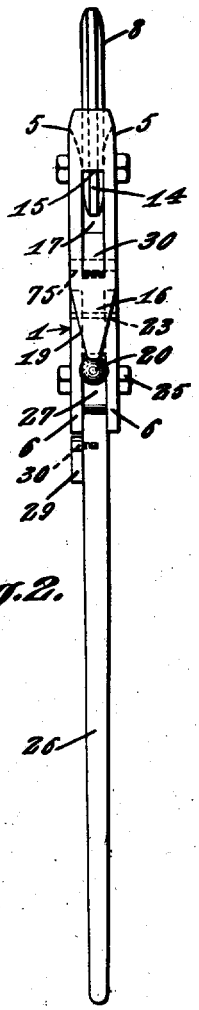

The invention will be more readily understood from a reading of the following specification and by reference to the accompanying drawings, in which an example of the invention is shown and wherein:

Fig. 1 shows in side elevation, a wrench constructed in accordance with the invention, parts being broken away and the grip being shown in dotted lines in its open position, and Fig. 2 is an elevation wherein the wrench is viewed edgewise.

The wrench as shown, includes a forked head 1 including an arm 2 and an arm 3, the arm 3 having a lateral projection 30. The arm 2 terminates in bifurcations 4, the arm 3 terminating in bifurcations 5. The head 1, has ears 6, one ear being supplied in its end with a seat or notch 60. The head 1 has an opening 7 communicating with the space between the ear.

The numeral 8 designates an arcuate grip, one part 9 constituting a finger and being located between the bifurcations 4 of the arm 2, when the grip is closed. It is obvious that the grip may be formed of one or more parts and is not necessarily made in one piece. The grip is connected to the bifurcations 4 by a pivot element 10, the pivot being located at the intersection of the finger and the main body of the grip. A curved spring 11 may be connected at one end 12 to the finger 9 of the grip 8, relatively near the pivot element 10, the spring 11 extending inwardly. The free end 14 of the grip is adapted to engage between the bifurcations 5, when the grip is closed, and is provided with a transverse shoulder 15.

The numeral 16 denotes a latch having an opening 17 wherein the shoulder 15 of the grip 8 is received, the shoulder co-operating with the latch at one end of the opening 17. The latch 16 is beveled as indicated at 18 and defines an acute angle with the adjacent portion of the grip 8. Because the latch 16 is beveled as indicated at 18, the grip 8 will engage automatically with the latch when the grip is swung to a closed position, and because the end of the latch 16 defines an acute angle with the adjacent portion of the grip, the finger of an operator may be inserted readily between the end of the latch and the grip, to disengage the latch from the grip. The rear end of the latch 16 is tapered as indicated at 19, a spring 90 being interposed between the said end of the latch and the arm 3 of the head 1. The spring 90 tends to maintain the latch 16 engaged with the shoulder 15 on the grip 8. The latch 16 is pivotally mounted, as indicated at 75, on the projection 30 of the arm 3, and terminates in a thumb piece 20, facilitating the manipulation of the latch.

Jaws 21 are mounted for limited reciprocation in the opening 7 of the head 1, in contact with the outer edges of the opening. The jaws 21 are supplied with elongated slots 22 through which extend pins 23, the ends of the pins being mounted in the head 1. The teeth 24 of the jaws 21 slope in opposite directions, to facilitate the holding of the work, when the wrench is swung in one direction or in an opposite direction.

A fulcrum bolt 25 is carried by the ears 6 of the head 1. The numeral 26 denotes a handle having an enlargement 27 mounted to swing on the fulcrum bolt 25 and located between the ears 6. On the inner end of the enlargement 26 are cam surfaces 28, each of which is adapted to co-operate with the inner end of one of the jaws 21. A T-shaped dog 29 is pivoted at 30 to the handle 26 and is adapted to coact with the seat 60, in a way to be pointed out hereinafter.

When the pipe or other article which is to be rotated or held against rotation in the wrench is received between the arms 2 and 3 of the head 1, the finger 9 is first engaged with the article to be gripped. When the wrench is applied to the work the grip is swung upward as shown in dotted lines in Fig. 1. It will be seen that the operator merely has to swing the wrench toward the work so that the finger 9 is brought into contact therewith, and a continued movement of the head causes the finger to be displaced rearwardly, whereby the grip 8 is swung. The spring 11 of course, first engages the work and is pressed back against the finger. As the advance of the head toward the work is continued, the grip 8 will be swung until the shoulder 15 rides into the latch 16 and is fastened, automatically without the aid of the operator. The spring 11 assists in holding the grip in contact with the work until the latch engages over the shoulder 15 under the impulse of the spring 90. However, the spring is not an essential element of the invention.

In using a wrench of this character the same is usually suspended so that it can be easily swung toward the pipe or other object constituting the work. The operator may easily release the grip either by pressing on the thumb piece 20, or displacing the end 18 of the latch outwardly. The grip is swung outwardly to the position shown in dotted lines in Fig. 1. With the parts in this position one man can easily swing the wrench toward the work so that the finger 9 is brought into contact therewith and the grip automatically swung into position and engaged under the latch in a very rapid and efficient manner. This is of great importance and makes for the success of the wrench as a tool.

This wrench is used either for rotating or for holding against rotation. When the handle 26 is swung one of its cam surfaces 28 co-operate with the corresponding jaw 21 and advances the jaw to cause said jaw to grip the work which is to be rotated or to be held against rotation. It is obvious that if the article is to be held against rotation, the handle 26 must be swung in the opposite direction and advance the opposite jaw to that which would be necessary if the article was to be rotated. If the handle 26 is swung in one direction, then one of the jaws will be actuated, whereas if the handle is swung in an opposite direction the other of the jaws will be actuated. The dog 29 may be swung on its pivotal mounting 30, so that one end or the other of the dog will be received in the seat 60. When the handle has tilted or swung an appreciable amount on the fulcrum bolt 25, the dog engaging with the rear end of the ear, at one end of the seat 60, prevents further swinging movement of the handle. As a consequence the jaw 21 can be advanced a predetermined amount only and it will be practically impossible to crush the object which is being turned, or to mar the object to an undesirable extent. It is within the province of the invention to eliminate the dog 29 and provide other means for limiting the gripping action of the jaws. It is obvious that sliding jaws are not essential to the operation of the wrench and other kinds of jaws and equivalent means may be used.

A wrench of this character permits of considerable variation of construction, particularly in the manner of making the grip and forming the head, and the invention is presented as including all such alterations, modifications and changes within the spirit thereof, and as probably come within the scope of the appended claims.

What I claim, is:

1. A wrench comprising a head having arms; a grip extended between the arms; jaws slidable in the head; and a handle fulcrumed on the head and having cams engaging the jaws.

2. A wrench comprising a loop-shaped head; jaws slidable in the head and shaped at their inner ends for engagement with the work to be rotated; and a handle fulcrumed on the head and having cams engaging the outer ends of the jaws, to advance one jaw at a time, when the handle is swung in opposite directions.

3. A wrench comprising a head having arms; a grip extended between the arms, the grip being pivoted at one end to one arm; a latch mounted on the other arm and interlocked with the other end of the grip, the first specified end of the grip being provided with an inwardly projecting spring adapted to engage the work; jaws slidable in the head; and a handle fulcrumed on the head and having cams engaging the jaws.

4. A wrench comprising a head having arms; a grip extended between the arms; jaws slidable in the head; a handle fulcrumed on the head and having cams engaging the jaws; and a dog movably mounted on the handle and engageable with the head to limit the swinging movement of the handle, and to limit the advancement of the jaws.

5. A wrench including a head having arms, a grip pivoted to one of the arms of the head, a latch at the other arm of the head, the free end of the grip engaging the latch when swung to its closed position, a finger attached to the grip and extending inwardly of the pivot of the grip and projecting between the arms in the path of the work when the grip is open, said finger serving to swing the grip into its closed position, whereby the free end of the grip is automatically engaged with the latch, a jaw movable in the head for engaging the work, and a handle fulcrumed on the head and having its inner end provided with a face for engaging said jaw and displacing same toward the work when the handle is swung.

6. A wrench including a head having arms, an arcuate grip pivoted at a point inwardly from its inner end and mounted on one of the arms of the head, the inner end of the grip projecting between the arms of the head and protruding into the path of the work, when said grip is open, a latch pivoted at the other arm of the head, the free end of the grip having a latch engaging element for automatically engaging the latch when the grip is swung to a closed position by the engagement of the protruding end of the grip with the work, the head and grip fitting snugly around the work when the latter is closed, a gripping element movable in the head for engagement with the work, and a handle pivoted to the head and having a face for engaging the gripping element for displacing the same toward the work when the handle is swung.

7. A wrench comprising a head having arms, a grip extending between the arms, gripping means movable in the head, a finger carried by the inner end of the grip for swinging the same to closed position, by contact with the work, a latch carried by one of the arms and automatically engaged by the outer end of the grip, and a handle fulcrumed on the head and having an actuating face for engaging the gripping means.

8. A wrench comprising a head having arms, a grip extended between the arms, the grip being pivoted at one end portion to one of the arms, a latch mounted on the other arm and engaged by the other end of the grip, the first specified end of the grip having a projection inwardly of the pivot adapted to engage the work when the grip is open, gripping means movable in the head, and a handle fulcrumed on the head and having an actuated face engaging the gripping means.

9. A wrench comprising a supporting member shaped to fit a pipe and having an arcuate work engaging face, a handle to which said member is attached, means operating in conjunction with the handle for gripping the pipe, a work engaging grip pivoted on said supporting member having a pipe engaging arcuate face extendng outwardly from its pivot point, and an automatic closing finger swung into the path of the pipe when the grip is opened for swinging the grip into contact with the pipe when the supporting member is moved toward the pipe, whereby the grip causes the arcuate face of the supporting member to engage the pipe, and means engaging the outer end of the grip for latching it around the pipe when said grip is swung by said finger.

10. In a pipe wrench, a support carrying a pipe gripping element having teeth, a grip pivoted on the support and having an arcuate gripping face extending outwardly from its pivot, an automatic arcuate closing finger extending inwardly of the pivot of the grip for swinging the grip around the pipe, means for latching the outer end of the grip around the pipe, and a handle pivoted to the support arranged to be swung to bring the pipe gripping element of the support and the grip into gripping relation with the pipe after the grip is latched.

11. A wrench comprising in combination, a supporting member having an arcuate pipe engaging face, a handle to which the supporting member is pivoted, a pipe engaging grip pivoted on said supporting member having an arcuate pipe engaging face extending outwardly from its pivot point, an automatic closing finger having a concaved face swung into the path of the pipe when the grip is opened acting to swing the face of the grip into contact with the pipe when the supporting member is moved toward the pipe, means engaging the outer end of the grip for latching it around the pipe when said grip is swung by said finger, and a pipe gripping element having teeth for gripping the pipe disposed relatively between the outer end of the grip and its latching means and the handle and actuated to grip the pipe when the handle is swung.

12. A pipe wrench comprising in combination, a supporting structure, a handle pivoted to said structure and extending outwardly therefrom, a grip having a concaved pipe engaging face and pivoted on one forward end of said supporting structure, an automatic closing finger having a concaved pipe engaging face attached to said grip for swinging the same to a closed position, latching elements carried by the other forward end of the supporting structure and the outer end of the grip for latching the grip around the pipe, and a pipe gripping element carried by the supporting structure and actuated to grip the pipe when the handle is swung.

13. In a pipe wrench, a support having a pipe seat, a pipe engaging element carried by the support, a grip pivoted to one end of the support, a handle pivoted to said support, an automatic closing finger connected to said grip and positioned in the path of the pipe when the grip is opened for closing said grip when the support is moved toward the pipe, and a latch free from said finger and co-acting with said support for fastening said grip in its closed position, whereby said pipe engaging element is engaged with the pipe when the handle is swung.

In testimony whereof I affix my signature.

GEORGE BARNETTE TREW.